3,406,091
CONTROL SYSTEM FOR LARGE REACTORS
Ian Norton MacKay, Peterborough, Ontario, Canada, assignor to Canadian General Electric Company Limited, Toronto, Ontario, Canada, a corporation of Canada
Filed Dec. 12, 1966, Ser. No. 601,042
3 Claims. (Cl. 176—28)

ABSTRACT OF THE DISCLOSURE

A pressure tube thermal power nuclear reactor with individual power zones, each having a separate coolant circuit is provided with reactivity suppression means permitting at least partial shut down of a selected zone, and booster means within the reactor operative on the zones adjacent the shut down zone to compensate for the loss of neutron activity from that zone, to maintain effective production of thermal power in the adjacent zones, whereby partial shut down of the reactor can be selectively effected.

---

Figure 2:
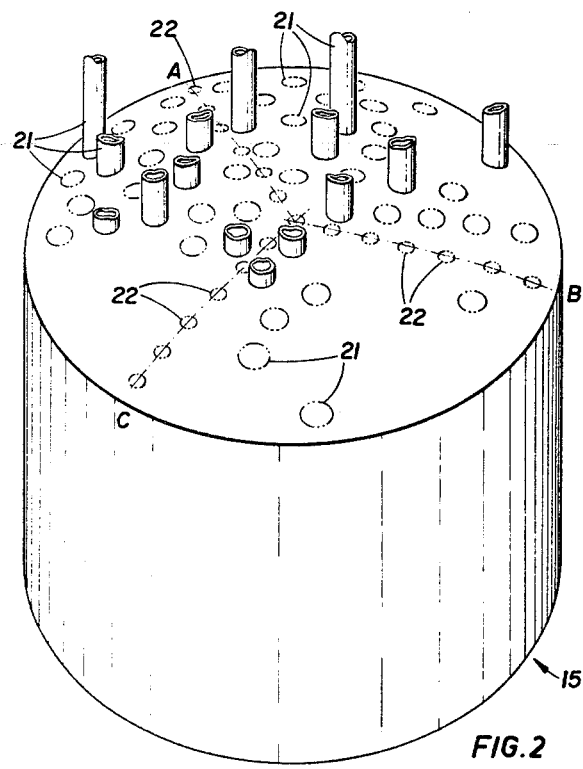

This invention relates to an improved nuclear reactor, and in particular to a nuclear reactor having the capability of partial shut-down.

The trend to increase the size of nuclear power units in order to reduce the overall cost of power production has provided the problem that in a power distribution system the unscheduled shut-down or "outage" of such a very large unit creates undesirable disturbances in the associated system, and thereby requires provision to be made for correspondingly large stand-by generation capability.

A further problem which exists with present nuclear reactors is the poisoning which occurs within the core of the reactor due to the build-up of xenon in the fuel. This poisoning, if permitted to continue for a certain critical time in the order of one half hour to an hour prevents the restarting of the reactor for a further period of time, usually between twenty-four and thirty-six hours.

In large reactors of the type including heavy water moderated reactors, the heat transport system which cools the core of the reactor while transporting useful heat to an external circuit is normally divided into several separate or separable circuits associated with a plurality of boilers.

The present invention provides a method of controlling a large nuclear reactor whereby a portion of the reactor may be effectively shut down, so that power production therein is reduced or prevented, for purposes both of system control and in order to carry out repairs or maintenance on the associated circuit and reactor component systems.

In order to carry out the method as set forth, there is provided a large power producing nuclear reactor having a core with a plurality of power producing zones, comprising: a reactor containment vessel; a plurality of groups of nuclear fuel within the vessel; a plurality of separate power generating heat transport circuits conducting coolant from the vessel to transfer useful heat from the fuel groups; and reactivity control means to selectively control the level of activity of the fuel groups, whereby partial shut-down of the reactor can be selectively effected.

While it is well known to introduce control rods within a reactor which are strongly neutron absorbent, it is also proposed that the reactor be divided into a number of zones, the boundaries of which are defined by the presence of insertable booster material in the form of enriched fuel rods, so that in the event that one portion of the reactor is shut down, the neutron activity of the adjacent portions of the reactor can be maintained at a level close to normal, without being unduly affected by the reduction in neutron activity in the adjacent reactor portion which has been shut down.

For purposes of illustration the preferred embodiment relates to a heavy water moderated reactor having heavy water as the heat transfer agent. The illustrated reactor is of the vertical pressure tube type, and the size of such reactor contemplated is in the order of 750 megawatts electrical power output, or greater.

Figure 1:
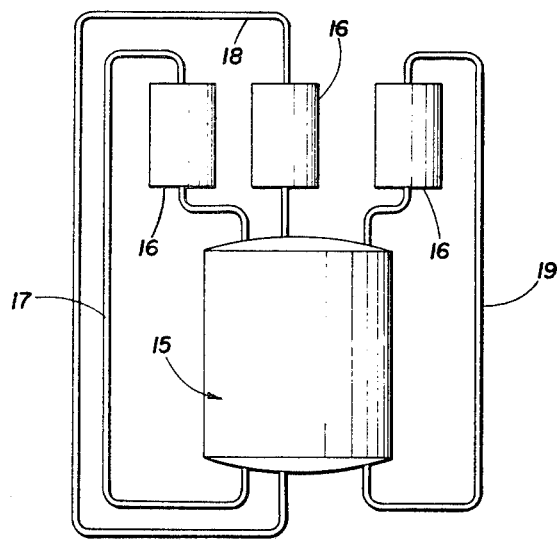

The following is a description by way of example of certain embodiments of the present invention, reference being had to the accompanying drawings in which:

FIGURE 1 shows a reactor and boiler system according to the present invention; and FIGURE 2 is a general view of a reactor according to the present invention having three independent power portions.

Referring to FIGURE 1 the reactor 15 supplies hot water to the three boilers 16 by way of three independent supply systems 17, 18 and 19.

Referring to FIGURE 2 the reactor 15 has a vertically extending callandria 20. The vertically extending fuel tubes of the callandria, which are not shown, are divided in the illustrated embodiment into three segmental portions A–B, B–C, and C–A by means of booster or enrichment rods 22 which define the boundaries between the adjacent segments or power sections.

Control rods 21 are formed of high neutron absorption materials such as boron, which are well known in the art, while the booster elements 22 generally include enriched material such as uranium 235 as a ready source of neutron radiation.

In operation, should instability of the reactor, or a requirement to reduce power either for external reasons or for servicing or maintenance of the reactor and its associated systems require that a portion of the reactor be shut down, then in order to shut down the segment A–B of the reactor it would be necessary to insert the control rods 21 among the fuel of the segment A–B in order to "scram" that portion of the reactor, at the same time also inserting the enriched control rods 22 on the boundaries of the isolated reactor portion, so as to make good the neutron emission which the isolated portion would otherwise have provided to the adjacent active portions B–C and C–A.

In addition to providing a stable system which is readily regulated, and to which minor repairs can be effected while maintaining a portion of the system "on line," the present invention also largely precludes the poisoning out of a reactor during partial shut-down, as the xenon built up within the shut-down reactor portion will subsequently be more rapidly destroyed than otherwise owing to the neutron activity of the adjacent reactor portions, so that a return to the loaded condition from the shut-down position can be much more readily effected.

While the foregoing disclosure has been directed to a vertically disposed heavy water moderated reactor, it will be evident that this method of operation can be applied to other large reactors.

It will be understood that many of the benefits of the foregoing invention may be obtained by utilizing partial shut down of a selected zone, generally while operating the remaining zones at full power, so that the total reactor power may be sustained at a high value for a prolonged period.

What I claim as new and desire to secure by Letters Patents of the United States is:

1. A pressure tube thermal generating nuclear reactor having a plurality of individual heat producing power zones, each zone having a separate coolant circuit for the transference of heat from said each zone; zone reactivity suppression means associated with at least one said zone to provide at least partial selective shut down of the zone; and reactivity booster means arranged to be selectively operable within the zones adjacent said partial shut down zone to provide enhanced reactivity of selected ones of said adjacent zones to offset the loss of neutron emission from said one zone when at least partially shut down, whereby partial shut down of the reactor may be effected while operation of other said zones is maintained.

2. A nuclear reactor as claimed in claim 1 wherein said reactivity booster means comprises enriched fuel rods.

3. A nuclear reactor as claimed in claim 2 wherein the intermediate boundaries of said zones are defined by said booster rods.

References Cited

UNITED STATES PATENTS

| | | | |
|---|---|---|---|
| 2,952,600 | 9/1960 | Newson | 176—17 |
| 3,140,237 | 7/1964 | Peterson et al. | 176—61 |
| 3,151,029 | 9/1964 | Schwoerer | 176—21 |
| 3,162,581 | 12/1964 | Brunner | 176—60 |
| 3,180,802 | 4/1965 | West et al. | 176—54 |
| 3,198,709 | 8/1965 | Macomber | 176—36 |
| 3,253,998 | 5/1966 | Hackney | 176—54 |
| 3,276,965 | 10/1966 | Leyse | 176—22 |

FOREIGN PATENTS

| | | |
|---|---|---|
| 618,243 | 4/1961 | Canada. |

BENJAMIN R. PADGETT, *Primary Examiner.*

H. E. BEHREND, *Assistant Examiner.*